United States Patent [19]

Ravagnani

[11] 4,016,916

[45] Apr. 12, 1977

[54] TIRE PLY STEER CONTROL

[75] Inventor: Frederick Joseph Ravagnani, Uniontown, Ohio

[73] Assignee: The Firestone Tire & Rubber Company, Akron, Ohio

[22] Filed: Apr. 7, 1975

[21] Appl. No.: 565,895

[52] U.S. Cl. .............................. 152/361 R; 152/354
[51] Int. Cl.² .............................................. B60C 9/18
[58] Field of Search ... 152/361 R, 361 FP, 361 DM, 152/354

[56] References Cited

UNITED STATES PATENTS

| | | | |
|---|---|---|---|
| 3,175,598 | 3/1965 | Cegnar | 152/361 R |
| 3,500,889 | 3/1970 | Boileau | 152/361 R |
| 3,515,197 | 6/1970 | Boileau | 152/361 R |
| 3,581,793 | 6/1971 | Wittneben | 152/361 R |
| 3,794,097 | 2/1974 | Kind | 152/361 R |

*Primary Examiner*—Drayton E. Hoffman

[57] ABSTRACT

A pneumatic tire provided with a tread portion, at least one body ply, and at least two stabilizer plies interposed between the tread and body ply, the radially innermost of the stabilizer plies having reinforcing cords oriented at an angle of approximately 54° to a meridian line of the tire to substantially eliminate ply steer force in the tire. The average angle of the reinforcing cords in all of the stabilizer plies may be made approximately 68° to a meridian line of the tire to provide good cornering stiffness force characteristics in the tire.

2 Claims, 2 Drawing Figures

TIRE PLY STEER CONTROL

BACKGROUND OF THE INVENTION

The present invention relates to pneumatic tire construction characteristics particularly applicable to radial ply tires. More particularly the present invention relates to a tire construction configuration which substantially reduces certain forces created by a tire in a straight ahead rolling condition which are particularly critical with respect to a radial ply tire configuration. More specifically, the invention relates to construction parameters for a radial ply tire which reduce the lateral forces on a radial tire known as ply steer to an insignificant magnitude without deleterious influence on other tire characteristics.

Ply steer and conicity are tire forces which are generated in a direction transverse to or laterally of the direction of rotation of a tire under load at the interface between the tire and road surface. Although the tire industry has been aware of the existence of these forces for many years, they have not been the subject of any significant extent of attention in terms of research or development inquiry for the reason that they assumed a relatively insignificant posture with respect to other considerations in the context of bias and bias-belted tires which have domestically constituted essentially the industry standards until very recently. Growing concern in an understanding of the nature and possible control of these forces has been substantially accelerated by the increased usage of radial tires since the magnitude and standard deviation in a plurality of tires in respect of radial tires is substantially greater than in the case of either bias or bias-belted tires. The relatively primitive status of the investigation of both ply steer and conicity forces is evidenced by the fact that there are no industry standards with respect to the interpretation, measurements or effects of these forces and that references thereto in the literature to date are limited virtually exclusively to speculation on the part of individuals carrying out research in regard to other tire and tire-vehicle interaction factors.

Concern is evidenced in the industry with respect to conicity; however, this lateral force component can normally be adequately managed as a matter of quality control. Since conicity in radical tires is believed to be primarily a function of belt centering, suitable construction standards can effect sufficiently accurate placement of the belts relative to the circumferential center line of a tire such that conicity can be maintained within acceptable limits. It is also significant that the conicity force developed by a tire does not reverse with a reversal of the direction of rotation thereof such that compensation for at least moderate irregularities can be effected by selective placement of tires on an appropriate side of car depending upon the conicity and total lateral force characteristics of that tire, the tire on the opposite end of the same axle, and the tires on the other axle of a vehicle.

In contrast, the ply steer force generated by a tire in rotating motion reverses upon reversal of the direction of rotation such that shifting of the tire to another position on a vehicle, if feasible, would not in and of itself produce a tendency to eliminate an undesirably high lateral ply steer force. Since ply steer forces in radial tires can readily achieve a magnitude of 60 to 70 pounds in what might be considered conventional radial tires of current vintage, a significant influence on the operating characteristics of a vehicle may be caused thereby. Primarily, ply steer manifests itself in terms of vehicle drift or dog tracking which is a condition wherein a vehicle operates at a constant yaw or sideslip angle to the direction of motion, thereby producing the observable result that the rear tires do not track in the path of the front tires. This may cause continual lateral scrubbing of the rear tires which is known to greatly accelerate wear.

Investigations which have been made in the industry have indicated that solution to the problem created by ply steer forces cannot be solved by selective loading, inflation, or control of rim width. Available information indicates that ply steer forces although variable to an extent with changing values of these functions remains quantitatively significant throughout a normal load range, over normal operating inflations and throughout a practical range of rim widths. Since these factors have been demonstrated to be insignificant in regard to the control of ply steer forces, speculation and theorization have largely focused on tire construction parameters which have been known to affect ply steer forces. For example, it has been theorized in the past that ply steer is primarily influenced by the tread, the outer stabilizer ply, or a combination of undefined influences including the tread and outer stabilizer ply.

As a result of the lack of definitive knowledge with respect to the cause or control of ply steer forces the industry approach has been generally to endeavor to optimize other force considerations or effect compensation for existing forces. Due to the significance attached to cornering stiffness forces, cords in the stabilizing plies of radial tires have generally been oppositely biased or oriented at a balanced angularity of approximately 68° to a meridian line of the tire in the case of two or more stabilizer plies, since desirable cornering stiffness forces in a tire have been found to result thereform. There has been some suggestion in the prior art of the desirability of measuring lateral force characteristics of a tire after construction and forming suitable indicia on the tire such that it may be combined with other like tires also similarly marked such that a compensating or offsetting force balance may be effected during mounting on a vehicle. Such a compensation suggestion would be expensive in terms of the equipment and labor necessary for accurately effecting the force measurements, would constitute only an approximation since account is taken only of the direction and not the magnitude of the forces in different tires, and makes no pretense of eliminating the cause of such lateral forces. Understandably, there has been no adoption of this suggestion in any significant sector of the commerical market.

SUMMARY OF THE INVENTION

Therefore, an object of the present invention is to provide a radial tire construction which produces a dynamically improved tire. Another object of the invention is to provide a radial tire construction exhibiting a reduced total lateral force when rotating under load at the tire-road surface interface. A further object of the invention is to provide a radial tire construction in which the ply steer force component of the total lateral force exhibited by the tire when rotated is substantially reduced or eliminated.

Still another object of the present invention is to provide a radial tire construction which does not adversely affect ride, handling, wear or other performance characteristics in comparison with a conventional radial tire of comparable configuration. A further object of the invention is to provide a radial tire construction which combines substantially reduced ply steer forces with improved cornering force, reduced harshness, improved high speed performance, and improved durability performance, all of which characteristics can exceed government specifications and, in at least some instances, conventional radial tires of comparable configuration. Yet another object of the invention is to provide radial tire construction parameters which are readily adaptable to a variety of types of radial tires being manufactured in terms of the number of body and stabilizer or breaker plies and the composition thereof.

Yet a further object of the invention is to provide a radial tire construction which can be manufactured on conventional tire building and curing equipment. Still another object of the invention is to provide an improved radial tire construction which does not result in additional costs in terms of labor or material in comparison with conventional radial tires of similar configuration.

In general, a pneumatic tire according to the concept of the present invention has a tread, at least one body ply, and at least two stabilizer plies interposed between the tread and body ply, with the radially innermost of the stabilizer plies having the reinforcing cords thereof oriented at an angle of approximately 54° to a meridian line of the tire such that the ply steer force of the tire is substantially zero. Good cornering stiffness characteristics for the tire may be maintained by making the average angle of the reinforcing cords in all of the stabilizer plies approximately 68° to a meridian line of the tire, as by making the angle of the reinforcing cords of the outer stabilizer ply an oppositely biased angle of approximately 80° to a meridian line of the tire.

These and other objects and features, together with the advantages thereof over existing and prior art forms which will become apparent from the following specification, are accomplished by the article hereinafter described and claimed.

DESCRIPTION OF THE PREFERRED EMBODIMENT

Figure 1:
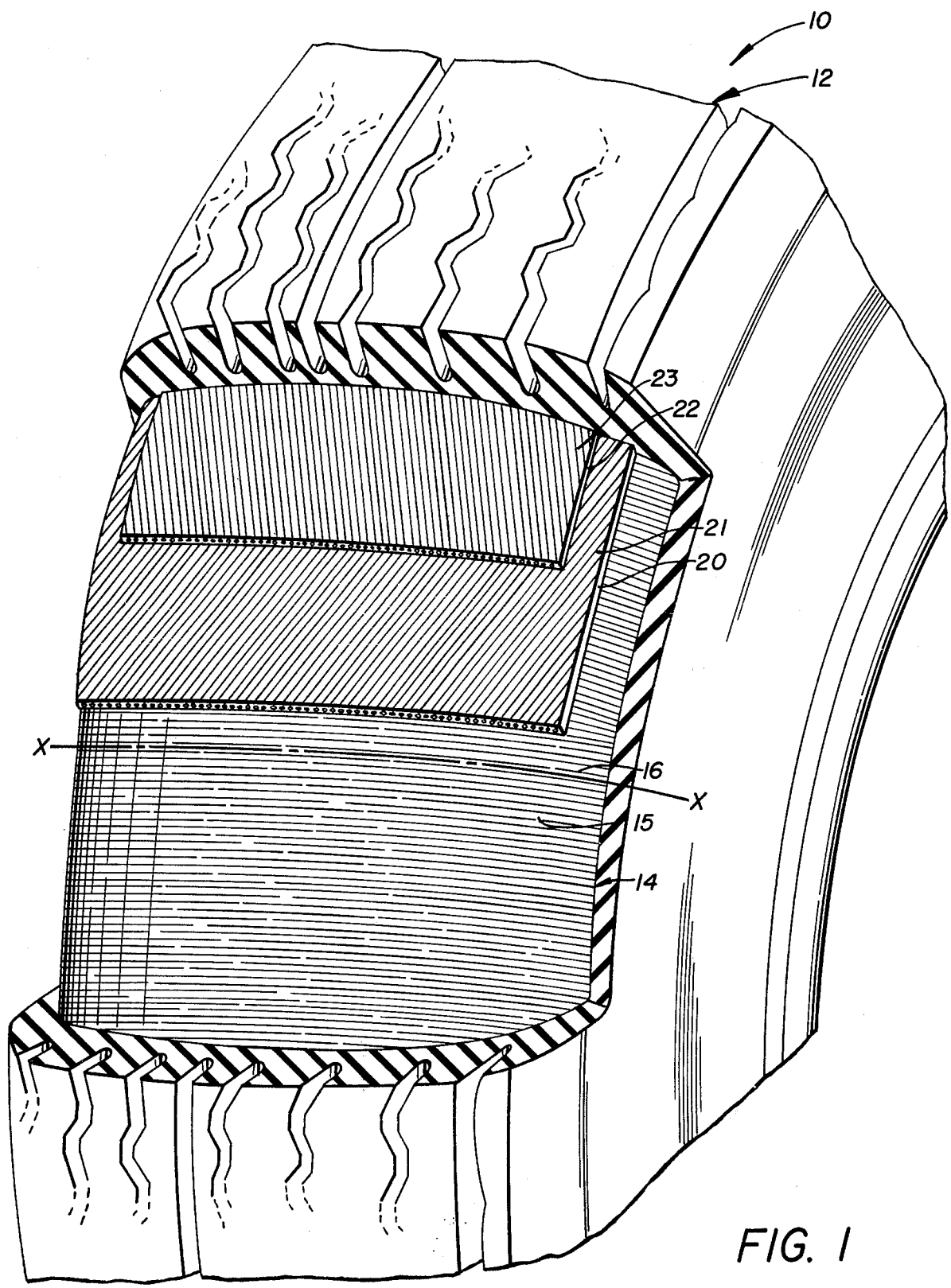
FIG. 1 is a perspective view of a fragmentary portion of a pneumatic tire embodying the concepts of the present invention with portions of the tread and breaker or stabilizer plies progressively broken away to more clearly depict structural components of a radial tire according to the present invention.

A tire in accordance with the concepts of the present invention, generally depicted by the numeral 10 in FIG. 1, is constructed basically in a conventional manner by combining a plurality of layers or plies which are integrally united one to another by a curing or vulcanization process subsequent to the tire building operation. The various layers or plies are constituted of an elastomeric body containing reinforcing cords. The constitution and configuration of both the elastomer and the cords is normally varied between plies to carry out the different functional purposes of the various plies in the overall makeup of thee tire. The elastomer may be of natural rubber or any of a number of synthetic compositions which have been developed over the years and are well known to persons skilled in the art. The cord elements may be made of a network of single filament or cabled strands which are commonly of steel wire, glass fiber, rayon, nylon or other suitable material.

As shown, the tire 10 has as its radially external component a tread portion, generally indicated by the numeral 12, adapted for rolling engagement with a road surface. The tread 12 is compounded in a conventional manner to effect a suitable balance between wear and traction characteristics.

The tire 10 also has a carcass, generally indicated by the numeral 14, which may be constituted of one or more individual plies. As graphically depicted in FIG. 1, the body ply, or outermost body ply, in the event of a plurality of body plies, 15 has a network of cords 16. As a distinguishing feature of a radial ply tire as contrasted with bias or bias-belted tires, the cords 16 of body ply 15 are oriented in alignment with a meridian line of the tire, depicted at X - X in FIG. 1, or at a 90° angle to a circumferential plane through the tire 10. The reinforcing cords 16 of body ply 15 may be of rayon, polyester, or other appropriate materials well known to persons skilled in the art.

Interposed between the tread 12 and the outermost body ply 15 are two or more plies which are preferably substantially laterally co-extensive with the tread portion 12 and are included for the purpose of stabilizing or providing rigidity for the tread 12 which would otherwise be subject to substantial circumferential elasticity due to the radial orientation and composition of cords 16 in the outermost body ply 15. As shown, two stabilizer plies (also referred to in the industry as belts or breaker plies or tread plies) are exemplarly depicted as an inner stabilizer ply 20 and as outer stabilizer ply 22. The stabilizer plies 20, 22 are preferably reinforced with cords 21 and 23, respectively, which are preferably of a relatively inextensible material such as a cabled steel wire so as to impart substantial circumferential rigidity or hoop strength to the tread 12. As seen, the cords of adjacent stabilizer plies 20 and 22 are oppositely biased or directed with respect to a circumferential plane through the tire 10 in accordance with standard industry practice, except that the angular extent of bias of cords 21 and 23 of stabilizer plies 20 and 22, respectively, is to a different and preferably specific extent in a manner hereinafter detailed.

It is to be understood that the tire 10 may be provided with one or two innerliner plies radially interiorly of the body plies, as well as sidewall and bead area configurations which are well known to persons skilled in the art. Although it is recognized that there are many possible variations with respect to the design of these components, such do not within a conventional format affect the parameters of the tire 10 as hereinbefore and hereinafter set forth.

It has been experimentally determined that the orientation of cord 21 in the inner stabilizer ply 20 controls the magnitude of the ply steer force generated by a tire in rotation to a good first approximation. In particular, it has been experimentally determined that ply steer is substantially reduced or eliminated in a radial tire with steel reinforcing cords in the stabilizer plies when the angular relationship between the cords of the radially inner stabilizer ply 20 are oriented at an angle of approximately 54° with respect to a meridian line X — X of the tire 10. The acute angle between a meridian line X — X of tire 10 and the cords is hereinafter referred to as the crown angle of the ply although in some instances industry standards may refer to the complement thereof as the crown angle. In the context of this specification approximately is deemed to encompass plus or minus 5° attributable to inadvertent errors which are necessarily incorporated during the fabrication and processing of a tire and other minimal factors of undefined origin.

Exemplary tests were made based upon the fabrication of five HR 78-15 test tires which were as nearly identical in all respects as could be produced, except for a specified variation in the crown angle of the inner and outer stabilizer plies. The otherwise identical tires were tested to determined ply steer forces in accordance with the equations derived in the paper of Bruce G. Lindenmuth, "Tire Conicity and Ply Steer Effects of Vehicle Performance", Paper No. 740074 presented at the SAE meeting of Feb. 25 - Mar. 1, 1974. The 1° cornering stiffness force was computed employing the equipment and test parameters set forth at p. 3 of the above referenced SAE Paper No. 740074. A polarity indication with respect to the stabilizer ply crown angles is indicative of the direction of angularity or bias, the "-" indicating a cord path from a builder's lower left to upper right during fabrication of the tire and a "+" indicating the reverse thereof. The test results with respect to the five exemplary tires are summarized in Table I as follows:

TABLE I

| TEST Tire NO. | STABILIZER PLY CROWN ANGLE (deg) | | PLY STEER FORCE (lbs) | 1° CORNERING STIFFNESS FORCE (lbs) |
|---|---|---|---|---|
| | INNER | OUTER | | |
| 1 | − 63 | + 73 | 46 | 311 |
| 2 | − 60 | + 75 | 24 | 307 |
| 3 | − 75 | + 76 | 95 | 292 |
| 4 | − 56 | + 81 | 9 | 308 |
| 5 | − 68 | + 68 | 66 | 278 |

Figure 2:
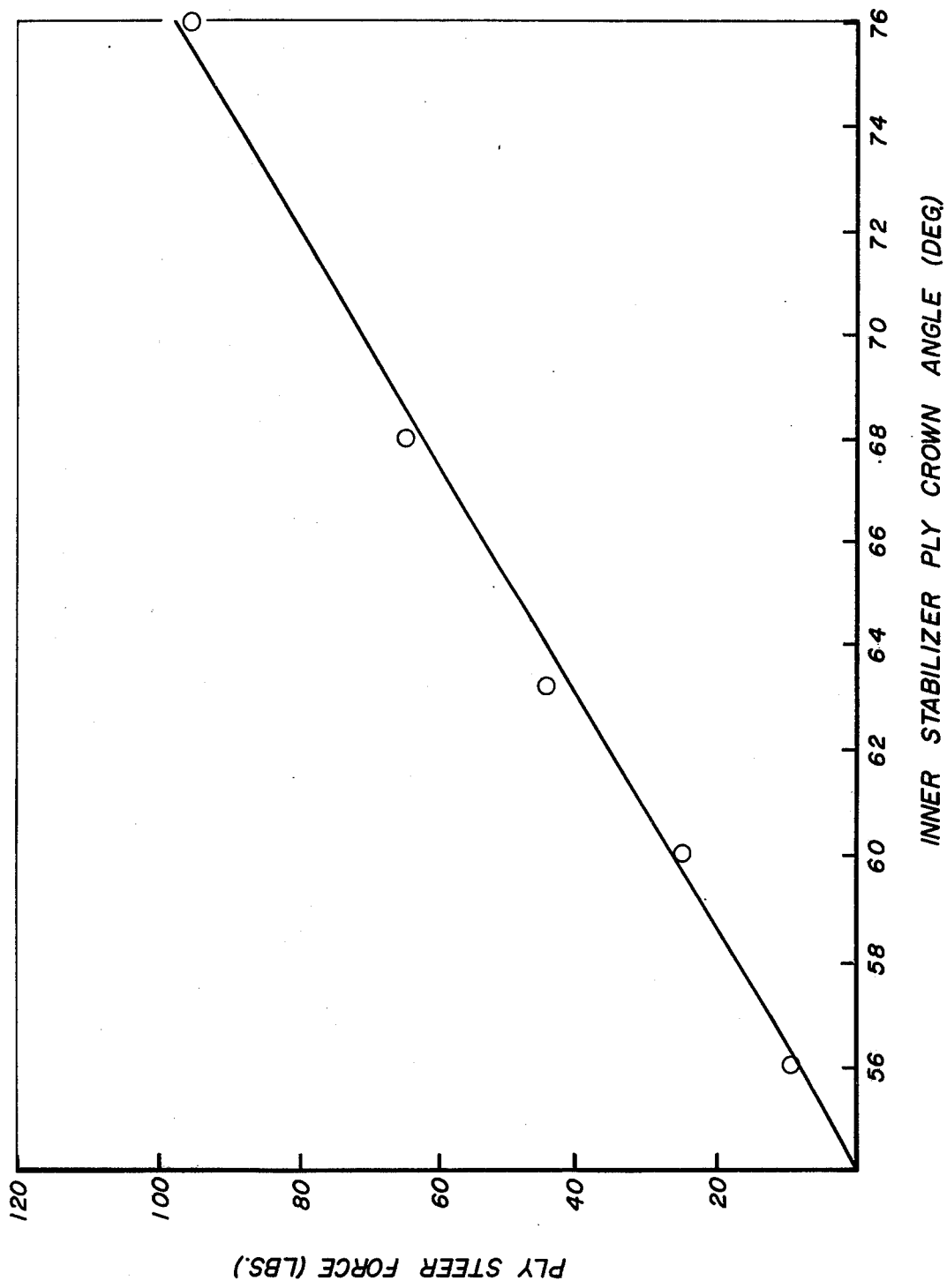
FIG. 2 is a graphic representation depicting the ply steer forces in radial tires as a function of variation in tire construction of the crown angles of the stabilizer ply adjacent the radially exterior body ply of the tire.

A graphic representation of the relationship between the inner stabilizer ply crown angle and the ply steer force is presented in FIG. 2 of the drawings. As is readily apparent, ply steer independently varies substantially linearly with the crown angle of the inner stabilizer ply at least from an inner stabilizer crown angle of about 76° to about 54°, at which time the ply steer force approaches or is substantially 0. It can thus be seen that a substantial reduction in the crown angle of the inner stabilizer ply from the generally accepted standard of approximately 68° independently of the outer stabilizer ply and other factors effects a controlled reduction of the ply steer force to an essentially negligible value.

Recognizing that the industry, based upon extensive testing over a number of years, has adopted as a standard the principle that the two or more stabilizer plies should be alternately angled or biased in terms of directivity and of substantially equal crown angles, there is the suggestion that an inner stabilizer ply having a crown angle of approximately 54° should be mated with an outer stabilizer ply having an oppositely directed crown angle of 54°. However, it is known that substantial deviation of the average stabilizer ply crown angle of the various stabilizer plies from approximately (±5°) 68° generally results in intolerable reductions in cornering stiffness force. It has been further experimentally determined in conjunction with the present invention that a deviation from a balanced stabilizer ply orientation such that the outer stabilizer ply crown angle is substantially in excess of approximately 68° maintains or perhaps even provides an improvement in the cornering stiffness force characteristics of a tire. For example, the data with respect to test tire No. 4 having an inner stabilizer ply crown angle of 56° and an outer stabilizer ply crown angle of 81° reflects a 1° cornering stiffness force of 308 pounds which is within acceptable limits and exceeds the cornering stiffness force for test tire No. 5 which has an oppositely directed balanced stabilizer ply crown angle orientation that could be considered representative of present commercial configurations.

Thus, it can be seen that a relatively low inner stabilizer ply crown angle of approximately (±5°) 54° which could be expected to produce an undesirable cornering stiffness force can be coupled with an outer stabilizer ply crown angle of approximately 80° to effect elimination of the ply steer force while retaining good cornering stiffness force characteristics in a tire. Fruther, the orientation of the outer stabilizer ply crown angle such as to place the cords in relatively close alignment with a circumferential line about the tire limits circumferential elasticity of the tread such that the tire exhibits wear characteristics equivalent to a conventional configuration otherwise similarly constructed. Further, the relatively wide variation between the crown angles of the inner and outer stabilizer plies serves to reduce harshness by virtue of the fact that impact forces in a tire thus constructed manifest a broader wave front and are therefore transmitted to the rim over a substantially greater surface area rather than at a relatively localized point.

It should now be apparent that the tire construction principles disclosed provide the capability of reducing to a negligible value or eliminating ply steer forces in a wide range of types of pneumatic tires, without sacrificing other tire performance characteristics. Thus, although one preferred form of tire construction embodying the invention has been disclosed and described in detail, it is apparent that other forms or modifications may exist. Accordingly, the scope of the invention is to be measured solely by the scope of the appended claims.

I claim:

1. A pneumatic tire comprising, tread means, body ply means, and at least two stabilizer plies interposed between said tread means and said body ply means, the innermost of said stabilizer plies having a crown angle of approximately 54°, whereby the ply steer force of the tire is substantially zero, and the outermost of said stabilizer plies having a crown angle of approximately 80° and being oppositely angularly biased with respect to the innermost of said stabilizer plies.

2. A pneumatic tire comprising, tread means, at least two stabilizer plies underlying said tread means, at least one body ply means, reinforcing cords in at least the outermost body ply oriented at a crown angle of approximately 0°, reinforcing cords in the radially inner of said stabilizer plies oriented at a crown angle of approximately 54°, and reinforcing cords in the radially outer of said stabilizer plies oriented at a crown angle of approximately 80°, the reinforcing cords of said radially outer stabilizer ply and said radially inner stabilizer ply being oppositely angularly biased with respect to a circumferential plane through the tire and the reinforcing cords in all of said stabilizer plies being oriented at a crown angle of approximately 68°.

* * * * *